US010301189B2

(12) United States Patent
Capeau et al.

(10) Patent No.: US 10,301,189 B2
(45) Date of Patent: May 28, 2019

(54) METHOD OF DEODORIZING SLUDGE AND DEVICE FOR PERFORMING SAID METHOD

(71) Applicant: OREGE, Toussus le Noble (FR)

(72) Inventors: Patrice Capeau, Marseilles (FR); Pascal Gendrot, Jouy en Josas (FR)

(73) Assignee: OREGE, Toussus le Noble (FR)

( * ) Notice: Subject to any disclaimer, the term of this patent is extended or adjusted under 35 U.S.C. 154(b) by 103 days.

(21) Appl. No.: 15/039,821

(22) PCT Filed: Nov. 27, 2014

(86) PCT No.: PCT/FR2014/053058
§ 371 (c)(1),
(2) Date: May 26, 2016

(87) PCT Pub. No.: WO2015/079171
PCT Pub. Date: Jun. 4, 2015

(65) Prior Publication Data
US 2016/0376169 A1  Dec. 29, 2016

(30) Foreign Application Priority Data
Nov. 27, 2013  (FR) .................................... 13 61698

(51) Int. Cl.
C02F 1/20      (2006.01)
C02F 1/24      (2006.01)
(Continued)

(52) U.S. Cl.
CPC .............. C02F 1/20 (2013.01); B01D 29/27 (2013.01); C02F 1/56 (2013.01); C02F 11/008 (2013.01);
(Continued)

(58) Field of Classification Search
None
See application file for complete search history.

(56) References Cited

U.S. PATENT DOCUMENTS 3,855,120 A * 12/1974 Garbo ..................... C02F 3/085
                                                  210/618
6,395,174 B1 * 5/2002 Teran ................... A01K 1/0103
                                                  210/605
(Continued)

FOREIGN PATENT DOCUMENTS

CA   2815956 A1 * 5/2012 ............. B01D 21/01
FR   2 966 819 A1   5/2012

OTHER PUBLICATIONS

International Search Report dated Feb. 20, 2015, issued in corresponding International Application No. PCT/FR2014/053058, filed Nov. 27, 2014, 6 pages.
(Continued)

Primary Examiner — Krishnan S Menon
Assistant Examiner — Bradley R Spies
(74) Attorney, Agent, or Firm — Christensen O'Connor Johnson Kindness PLLC

(57) ABSTRACT

The continuous treatment of a flow of organic liquid sludge is disclosed. Following the optional addition of granular mineral matter to the flow, the sludge is injected at a rate q into a column of air which is at overpressure relative to atmospheric pressure. The air column is circulating at a rate Q>5q in a chamber extending over a specific length in order to create a fluidized bed, in which the sludge is aerolized, between air supply piping upstream of the sludge injection and an outlet reservoir downstream of the fluidized bed, the reservoir being substantially at atmospheric pressure. A flocculant is introduced continuously downstream of the chamber into the fluidized bed in order to aggregate the organic matter before the solid part obtained in this way is separated from the liquid part, the resulting solid part thus being deodorized.

25 Claims, 2 Drawing Sheets

(51) Int. Cl.
  *C02F 1/72* (2006.01)
  *C02F 1/74* (2006.01)
  *B01D 29/27* (2006.01)
  *C02F 11/00* (2006.01)
  *C02F 11/14* (2019.01)
  *C02F 11/121* (2019.01)
  *C02F 1/56* (2006.01)
  *C02F 1/52* (2006.01)

(52) U.S. Cl.
  CPC ............ *C02F 11/121* (2013.01); *C02F 11/14* (2013.01); *C02F 1/24* (2013.01); *C02F 1/5245* (2013.01); *C02F 1/5281* (2013.01); *C02F 1/722* (2013.01); *C02F 1/74* (2013.01); *C02F 2209/03* (2013.01); *C02F 2209/38* (2013.01); *C02F 2209/40* (2013.01); *C02F 2301/066* (2013.01); *C02F 2303/02* (2013.01); *C02F 2305/12* (2013.01)

(56) References Cited

U.S. PATENT DOCUMENTS

2010/0170854 A1* 7/2010 Casbeer .................. B63J 4/004
  210/710
2013/0220937 A1 8/2013 Capeau et al.
2013/0227997 A1* 9/2013 Capeau .................. B01D 21/01
  71/12

OTHER PUBLICATIONS

Written Opinion dated Feb. 20, 2015, issued in corresponding International Application No. PCT/FR2014/053058, filed Nov. 27, 2014, 8 pages.

International Preliminary Report on Patentability dated Nov. 11, 2016, issued in corresponding International Application No. PCT/FR2014/053058, filed Nov. 27, 2014, 7 pages.

* cited by examiner

FIG.1

METHOD OF DEODORIZING SLUDGE AND DEVICE FOR PERFORMING SAID METHOD

The present invention relates to a method for deodorizing sludge fed in a continuous or semi-continuous flow at a flow rate Q.

It also relates to a device for deodorizing sludge, implementing such a method.

It finds particularly significant, but not exclusive, application in the field of the elimination of odors and the reduction in volume of organic or biological sludges with a view to subsequent use, for example for spreading.

When industrial or communal wastewater is treated, sludges which contain a significant quantity of organic matter are obtained, independently of the treated water.

These sludges incorporate microorganisms in particular in the form of aerobic and anaerobic bacteria, which, as soon as they are deprived of oxygen, develop into anaerobic regimes that can rapidly produce foul-smelling odors.

This is because the respiration of the bacteria results in the formation of hydrogen sulfide, methane, and substances with unpleasant odors such as mercaptans or even ammonia.

In a general manner and in order to treat and eliminate organic sludges, a number of techniques exist. Either they are spread directly onto cropland, or they are thickened by having the carbon extracted therefrom under a controlled anaerobic regime, or they are dried by means of belt filters or centrifuges.

The existing techniques for extracting the water from the sludges are in fact essentially compacting, which increases the solid-compound content (in % by weight of the total mixture) by around 5%, centrifuging or filtration, which both increase the solid-compound content by 18 to 25%, and finally drying (by combustion or spreading over a number of weeks), which increases the solid-compound content by 90 to 95%, bearing in mind that the amount by weight of solid compound in the sewage sludges is generally between 0.1 and 1% of the total weight of the effluent.

However, these subsequent treatments do not solve the problem of odors.

Specifically, while they are being used, deployed and/or moved around, the transported sludges release foul-smelling odors which hamper trouble-free operation of the plant without risk to the personnel.

Methods for deodorizing sludges in which the sludges are treated with compounds that release active oxygen, such as hydrogen peroxide, alkaline perborates, alkaline persulfates, etc., are already known (FR 2 412 505). Such methods are costly since they require in particular the regular and systematic addition of specific reagents.

Methods that require the addition of nitrogen oxide gases (NO, $NO_2$, $N_2O$, $N_2O_3$, etc.) to the sludges, wherein the contact time of the sludges with the nitrogen oxide gas is several tens of minutes (for example 300 minutes), are also known.

The idea here is to keep the sludges in contact with the nitrogen oxide gas for a sufficiently long time for the chemical exchanges to take place prior to the actual dewatering treatment.

Thus, all of these treatments known from the prior art have drawbacks that are either connected with the need to add reagents that are expensive and complicated to employ, or are connected with the treatment time and with the sometimes less than reliable and/or not easily reproducible results.

They do not allow and/or do not prepare the dewatering as such of the sludges.

A method for drying liquid sludge by mixing sludge and air in a chamber under certain conditions is also known (FR 2 966 819). Although such a method makes possible good results, it may again be improved especially regarding the deodorization of the sludge obtained.

The present invention aims to provide a method and a device for deodorizing sludges that meet the practical requirements better than the previously known methods and devices, in particular in that it will allow an odorless sludge and/or a sludge that smells of humus to be obtained, while allowing excellent dewatering and/or dewatering (subsequently carried out in a known manner) that is clearly superior to that obtained with the existing techniques, this being done in a very rapid manner, the use of the method according to the invention only requiring a few seconds before a result is obtained.

In particular, this method makes it possible to obtain excellent results on its own and for very organic sludges, that is to say sludges that are essentially loaded with phospholipids, polysaccharides, bacterial residues, volatile fatty acids etc. (>60% by weight of organic matter compared with the weight of dry matter (DM)).

It also allows an optimized yield when it is combined with a complementary separation tool disposed downstream of the device (belt filter or centrifuging), enhancing solids increase by more than 5%, for example 10%.

The solution of the invention furthermore exhibits very low electrical consumption and does not use much consumable material (additive) or uses a low-cost material (compressed air).

In addition, the method employs a simple and very compact device which is easily transportable and which can thus be installed on sites without easy access.

Continuous operation is possible with the invention, with operating constraints that are not very demanding.

Finally, besides removing odors, the treatment according to the invention does not otherwise create any pollution. In sum, a cake that is porous, dewatered, odorless and is made of a residue that is directly spreadable and/or usable is immediately obtained with the invention.

With this aim, the invention proposes in particular a method for continuously treating a flow of liquid sludge, wherein the flow is injected at a flow rate q into a chamber at an increased pressure compared with atmospheric pressure, while also injecting air at a flow rate $Q \geq 5$ q into said chamber, prior to evacuation and separation between solid and liquid parts obtained, downstream of the chamber, characterized in that the liquid sludge is an organic sludge, the method being applied to the deodorization of the solid part obtained, in that the sludge is injected into a column of air at an increased pressure that is itself injected at said flow rate $Q \geq 5$ q, said column extending over a given length L along a longitudinal axis, said length L, the flow rate and the increased pressure of said column of air being designed to create in the chamber a fluidized bed wherein the sludge is aerolized, between a pipe for feeding the air and a line or reservoir downstream of the fluidized bed obtained, in that said fluidized bed is evacuated into said line or said reservoir that is pressurized to atmospheric pressure or substantially to atmospheric pressure, and in that a flocculant is continuously introduced into said fluidized bed downstream of the chamber under conditions designed to aggregate and/or coagulate the organic matter, so that a deodorization of the solid part obtained after separation is obtained.

The length L, the flow rate and the increased pressure in the chamber are determined in an optimized manner and within the abilities of a person skilled in the art as a function of the qualities and composition of the sludges treated and of the desired treatment flow rate. Similarly, the flocculant is chosen and its feed flow rate determined as a function of the characteristics imposed above on the chamber and its supply of sludge and air, so as to aggregate and/or coagulate the organic matter in an optimized manner.

These values are obtained as the case may be by successive adjustments within the abilities of a person skilled in the art, a chemical engineer.

Regarding the flow rates Q and q, the gas flow rate is conventionally measured in $Nm^3/h$. It is recalled here that the value of a gaseous flow rate is conventionally given in $Nm^3/h$ (normal cubic meters/h), the volume (in $Nm^3$) being considered here at its value relative to a pressure of 1 bar, a temperature of 20° C. and 0% humidity as conventionally used by a person skilled in the art.

The chamber is thus fed and evacuated continuously at the same or substantially the same continuous inlet and outlet flow rate of the liquid sludge.

In one advantageous embodiment, granular inorganic material is added to the flow, for example upstream of the injection of air, and/or beforehand to the sludge to be treated.

Thus, by introducing a liquid organic sludge (comprising for example more than 70% by weight of organic matter) that is loaded (or not loaded, depending on the sludge) with granular matter, for example sand or some other granular fuel inside a pressurized column through which the air passes at a flow rate greater than 5 times the flow rate of the liquid sludge, the air being introduced through a number of (or one) manifolds located in the bottom part of the chamber, and the sludge being introduced through a tube located in the bottom part of the column in the gaseous bed, the liquid product is split up in the gaseous bed on account of the impacts upon its introduction into the chamber.

In fact, during the transfer process in the column, the treated flow changes phase, passing from an emulsion or suspension of organic matter in the air to an emulsion of air in this organic matter.

In a spectacular manner, a part of the air introduced thus defuses homogeneously over all of the organic mass, in centimeter-scale or millimeter-scale microbubbles.

The emulsion obtained is sludge (dispersed phase) in air (continuous phase), the sludge being coated with the air, the agitating effect and the different increased pressures furthermore making it possible to partially break the physical bonds of the van der Waals type, and the bonds of the electrical type that exist between the organic particles and each other and between the organic particles and the water.

Thus, the flow is at this stage a soup in which the water and the organic matter cohabit but provide fewer physical bonds.

The flow has become aerated and, even if this is for a shorter time, allows the elimination of odors by the significant addition of oxygen associated with the injection of air at a high flow rate.

In the container and otherwise, the action of the flocculants becomes very favorable.

Specifically, the flocculants, which are hydrophobic substances, trap bubbles of air in contact with the sludge.

The flake formed is thus not only very dewatered but also very aerated and porous.

A sludge having a bulk density of 1.1 $g/cm^3$ passes virtually instantaneously to 0.9 and as far as 0.6 at the end of percolation of the water kept in contact with the sludge.

It can be seen here that its bulk density is close to, or even less than, that of pumice stone, i.e. 0.6 $g/cm^3$, in fact from 0.5 to 0.8 $g/cm^3$, for 0.9 $g/cm^3$ for the pumice stone.

This micrometer-scale and millimeter-scale porosity is favorable for the dewatering of the organic mass, the pores acting as drains.

This is thus an unexpected advantage obtained for sludges the vast majority of which are organic.

It should be noted that after flocculation a conventional organic sludge has a bulk density slightly greater than 1 and much greater than 1 after dewatering using a conventional technique.

Since the flocculant furthermore traps the air in contact with the organic matter (OM), this gives the OM great biological stability.

Thus, even during the treatment of a sludge originating from an aerobic digestion process, the immediate effect of the process is to eliminate the phenomenon of odor. With the invention, and following flocculation, it can be seen that the sludge is odorless.

Depending on its subsequent conditioning, this effect can be prolonged indefinitely.

Specifically, it is sufficient to structure this organic matter by extrusion or comminution, or even by storage at a thickness of several tens of centimeters or to store it following thickening.

Beyond that, water risks being trapped and not being able to drain away, thus resulting in the creation of a biological regime favorable to the production of foul-smelling odors.

It is possible to provide here and for example a system of at least two filtering bags, one being filled while the other is empty, with a cutoff point of 100 µm, or even 300 µm, or more, for example 500 µm, without impairing the quality of the water, which thus remains extraordinarily below 100 mg/l of COD for biological sludges and less than 200 mg/l for digested sludges.

This mode of operation for bags from 1 $m^3$ to 5 $m^3$ makes it possible to obtain excellent traceability and instantaneous utilization of the sludges with a DM of 100 g/l minimum.

Advantageously, the invention thus also proposes a complementary step of structuring the dewatered sludge obtained.

It should also be noted that centrifuging produces a porous sludge having a bulk density lower than that of water when it is positioned downstream of this method.

By way of this structuring effect, the OM dries very rapidly. There are of course means, advantageously for accelerating the dewatering in particular by heating.

This rapid dewatering associated with oxygen saturation of the medium ensures the presence of aerobic bacteria. If centimeter-scale structuring is successful, the depletion of water is parallel to the consumption of the dissolved oxygen such that the bacterial population decreases on account of a lack of water but is never looking for oxygen from $NO_3$ or $SO_4$, which would have the effect of producing foul-smelling odors, by reduction of these elements.

By virtue of the method according to the invention, the increase in redox of the medium is measured in several tens of mV, bearing in mind that the longer the aeration lasts, the more favorable the increase in redox is, up to a certain point, as is the case with the action of stripping gases.

It will also be noted that the water separated has benefited from the same physical and chemical treatment as the organic matter. Specifically, the air is not trapped therein but the redox is also increased, the colloidal fractions being fixed to the OM, leaving transparent water with a load of MIS and organic matter much lower than when the conventional techniques are carried out without being associated with the method according to the invention.

In advantageous embodiments, one and/or more of the following dispositions is additionally and/or furthermore employed:
the flow of sludge is injected into the chamber opposite and at a distance d of less than a given value from a wall and/or from a screen of said chamber;
d is less than 50 mm;
the pipe feeding the air is located upstream of the injection of sludge;
the absolute pressure P of the column of air is greater than 1.5 bar.

Advantageously, the sludge is thus sprayed at high speed against a screen inside the chamber, the end of the tube projecting towards the inside, for example being directed perpendicularly and thus being located at a distance d≤50 mm from the facing wall.

A dispersion device of the spring type may also be provided.

With the method according to the embodiment described more particularly here, the liquid rises in the fluidized bed. On account of the force of the impacts against the wall of the chamber and the proportion between gas and liquid, splitting up of the solid and/or colloidal structure is unexpectedly observed, the liquid split up in the gaseous bed rising at the speed of the gases, such that stripping of the odorous molecules ($H_2S$, $NH_3$) is carried out in an extremely efficient manner.

If the stripping is desired, specific physicochemical conditions can be proposed: increasing the pH, the temperature (for stripping $NH_3$), etc.

In one advantageous embodiment, the pressure in the chamber is maintained by a flap system. At the outlet from the pressurized zone, the bed undergoes, by contrast, a decompression that is favorable to the work of agglomerating the organic matter that is the result of the addition of flocculant.

The flap in fact creates a head loss allowing the increased pressure in the chamber. It is in the closed position at maximum pressure and then operates for example in an oscillatory mode. The frequency of the oscillatory regime is then established by the maximum pressure of the increased pressure.

For example, for this purpose, with the chamber vertical, the flow is evacuated continuously or intermittently from the top part of said chamber by way of a pressure relief valve that triggers above a given threshold value defining the increased pressure of the column of air.

In order to optimize the splitting up, the granular mineral matter used consists of impact reagents of the type of sand, carbonates, draining porous compounds of the type of pozzolana, zeolites, etc., with the quantities, granulometry, composition, etc. being varied depending on the effluent and the desired results in a manner which is within the abilities of a person skilled in the art.

Specifically, it was possible to see that the addition of granular matter increases the effectiveness and makes it possible in particular to help break the bonds between the bound water and the organic matter, but also to make the floc heavier, this then greatly facilitating the separation thereof from the liquid.

In further advantageous embodiments, one and/or more of the following dispositions is also employed:
the solid matter is separated continuously from the liquid by filtration through successive bags that are charged as they are filled with the filtered solid matter;
the air flows at a flow rate Q≥20 q, for example greater than 40 q, 60 q or 100 q, or between 20 and 60 times q;
the flow rate q is greater than or equal to 10 $m^3$/h, the flow rate Q being greater than or equal to 100 $Nm^3$/h, for example greater than 200 $Nm^3$/h, and the relative pressure in the chamber is greater than or equal to 1 bar (absolute pressure 2 bar), for example greater than or equal to 1.2 bar;
the flocculant is added in a proportion of between 0.5% and 3% of the dry matter content contained in the sludge. The dry matter content is understood to be the % by weight of solid over the total % by weight of the effluent. For example, between 5 kg and 25 kg of commercial product will be consumed per tonne of DM;
the flocculant is organic of the cationic type. This is for example an addition of polymer known under the references Ashland 860 BS, Ciba 8646 FS, SNF HIB 640 or 840 from the companies of the same names. For example, for a sludge containing 7 g/l of solid matter (SM), 50 g of raw polymer for example prepared at 5 g/l, i.e. an injection of 10 l of solution per $m^3$ of sludge. The injection takes place advantageously immediately at the outlet from the column;
the effluents are degassed at the outlet of the chamber and the gases obtained are used to feed the injection of air in the bottom part.

The granular inorganic matter is used for example at a level of 10%, 5%, 4% or 1% of the DM content of the sludges.

As has been seen, this is advantageously sand, calcium carbonate, slaked lime, etc.

It is introduced upstream of the column for example within a tank for mixing with the liquid sludge.

In an advantageous embodiment, there is also an addition of oxidation reagent.

In certain applications for example when the sludges contain a large amount of organic fatty acids or when the sludges are sludges obtained from a methanizer, this supplementary addition makes it possible to obtain an excellent result, for example in a proportion of 1 l of $H_2O_2$ for 1 $m^3$ of sludge containing 40 g/l of DM.

Also advantageously, provision can be made of an addition of reagent with the aid of the coagulation of the organic matter: for example for a sludge with 11 g/l of DM and 8% of MV (ratio between organic matter and dry matter) and for 500 ml of sludge, 1 ml of $FeCl_3$ (10% solution) is added upon the introduction of the liquid into the column, prior to the introduction after the column of the flocculant;
the cake obtained is recovered and dewatered by drying, pressing or centrifuging in order to obtain a solidified pancake. The latter has excellent microporosity. This microporosity provides a considerable advantage, with grooves allowing rapid evacuation of the unbound water and pores allowing strong aeration of the sludges and the maintenance of an aerobic bacterial regime.

The invention also provides a product obtained directly by the above-described method.

It also provides a solidified and structured sludge pancake obtained with the above-described method, which is characterized in that it is formed of layers and/or strips of sludge disposed one on top of another in an aerated manner.

Advantageously, the sludge pancake obtained has a porosity of greater than 40%, for example of the order of the porosity of pumice stone (of the order of 85%).

The invention also provides a device for implementing the method as described above.

It furthermore provides a device for treating a flow of liquid sludge fed continuously at a flow rate q, comprising means for feeding air at a flow rate Q≥5 q, a chamber extending over a given length L and along a longitudinal axis, designed to be fed by the air feeding means in the bottom part and comprising at least one tube for feeding sludge, said tube being located in the lower half of said chamber, means for injecting the sludge at said flow rate q into the chamber through said tube, an outlet line or reservoir of the flow of aerolized sludge downstream of the chamber, and means for separation between the solid part and the liquid part of the treated sludge, characterized in that, since the liquid sludge is organic, the length L, the flow rate Q and the increased pressure in the chamber are designed to create a fluidized bed, in that said line or reservoir comprise means for pressurizing to atmospheric pressure or substantially to atmospheric pressure, and in that the device comprises means for introducing a flocculant continuously into said line or said reservoir in order to aggregate/coagulate the organic matter in said line or said reservoir while deodorizing it, before the introduction into said separation means.

Advantageously, the device comprises means for feeding granular inorganic matter into the flow of sludge upstream of the air feeding means.

In an advantageous embodiment, at least one tube for feeding sludge to be deodorized is provided, said tube being located in the lower half of said chamber, the end of said tube projecting into the chamber and being located above the air feed and at a distance d from the opposite wall such that d≤50 mm.

Again advantageously, the device is designed such that the flow is evacuated from the top part by way of a pressure relief valve that triggers for example above 2 bar absolute.

In an advantageous embodiment, with the chamber having a diameter D, the given length L is greater than 10 times D.

Also advantageously, the outlet line has a diameter $d_0$ of between 0.5 D and 0.9 D.

The invention also provides a device comprising means for feeding a liquid oxygenation or coagulation reagent at a given flow rate.

Advantageously, the device comprises means for recovering the dewatered treated sludge that are formed by at least one filtration bag or hopper, a drying bed being provided by a draining layer consisting of sand.

The device also comprises for example means for recovering and recycling the granular inorganic matter.

In an advantageous embodiment, the device also comprises means for extruding the dewatered treated sludge in separate rolls in the presence of compressed air.

The extrusion means are formed for example by a cylindrical part which is perforated with a plurality of holes and in which the sludge is compacted and extruded through the holes.

The invention will be understood better from reading the following description of embodiments that are given hereinafter by way of nonlimiting example. The description refers to the accompanying drawings, in which:

FIG. 1 is an operating diagram of one embodiment of a device according to the invention.

Figure 1:
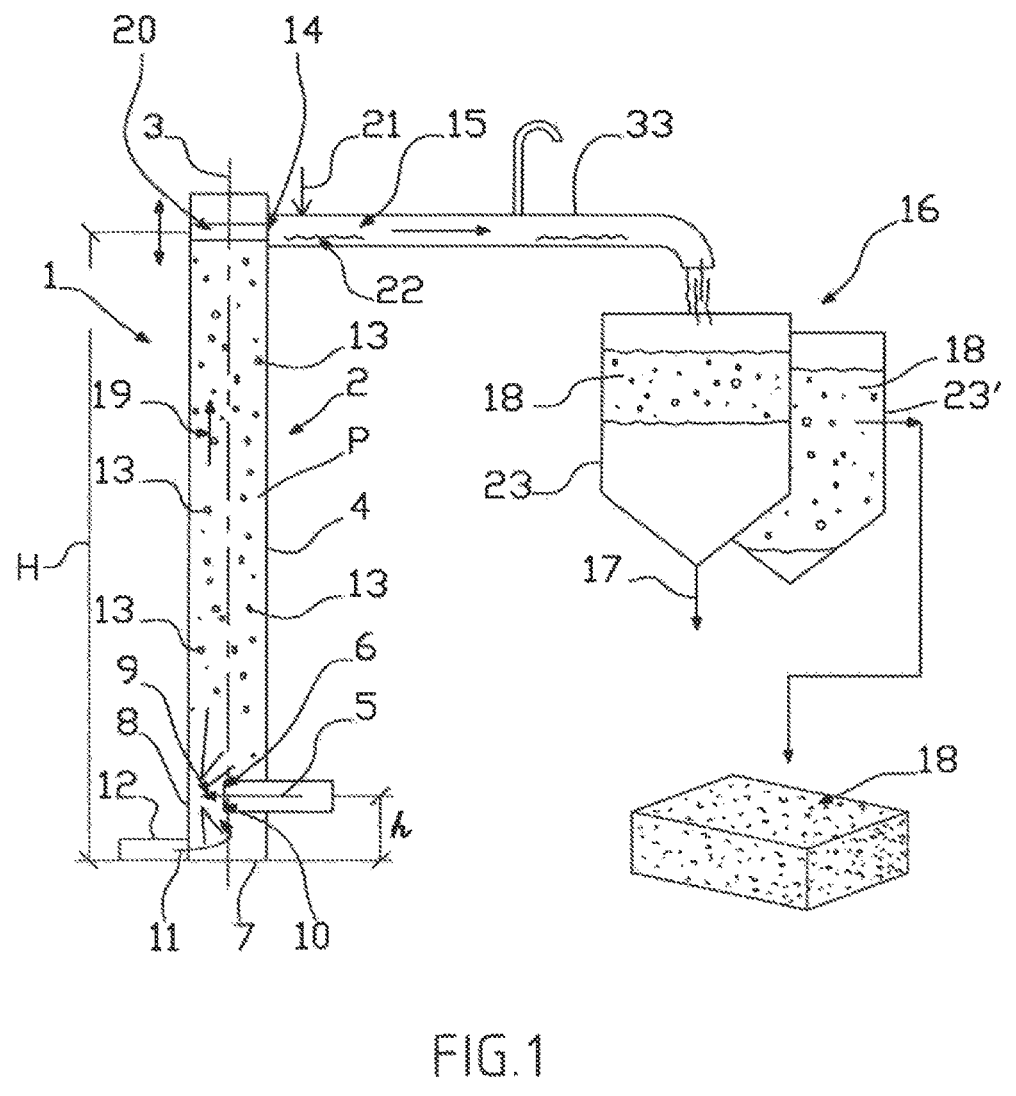
Figure 2:
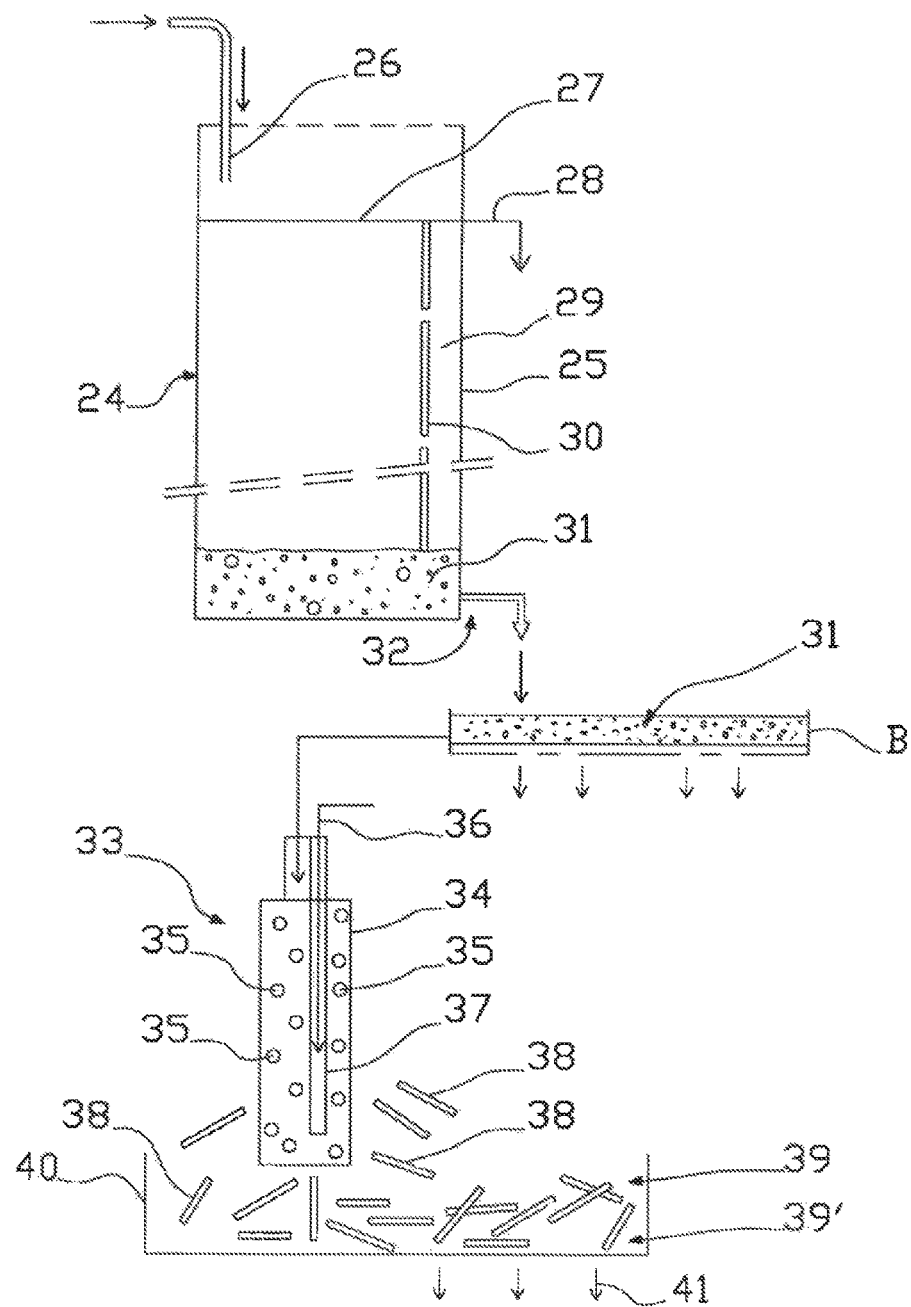
FIG. 2 illustrates a variant of the end of treatment of the sludge, according to another embodiment of the invention.

FIG. 1 shows a device or reactor 1 formed by an elongate chamber 2 that extends about an axis 3, for example formed by a vertical cylindrical column 4 of small diameter, for example 20 centimeters. The sludge is injected (arrow 5) through a port 6 at a flow rate q, for example 5 m³/h.

The port is located in the bottom part of the chamber, for example at a distance h from the bottom 7 of the chamber of between a tenth and a fifth of the height H of the chamber.

This port is located and opens out at a distance of a few centimeters from the opposite wall 8 and allows the flow of sludge to be fed under pressure, causing a significant impact on contact with the wall.

In other words, the pumping of waters from the outside (not shown) that are introduced into the chamber of the reactor 1 of small diameter allows an impact of the flow of sludge in the zone 9 on account of the outlet pressure of the feed pump(s) (not shown), this depending on the height of water in said feed pumps upstream of the ports and the head losses in the circuit.

Conventionally, using commercial industrial pumps and a circuit without excessive aberrations, a pressure of 2 bar at the outlet 9 of the port in the chamber is easily achievable.

The kinetic energy of pumping is then converted into impact energy, which is maximized by increasing the speed of introduction into the chamber for the outlet from the port through a regulator 10 which has a size that is reduced but compatible with the maximum granulometry of the sludge.

Furthermore, and according to the embodiment of the invention that is described more particularly here, a quantity of air at a raised pressure is introduced (arrow 11) below the zone 9 at a very high flow rate Q much greater than 5 Q, for example 20 Q (in Nm³/h).

The expression "at a raised pressure" is understood to mean a slight increase in pressure which may be between 0.1 bar relative and 1 bar relative compared with the pressure of introduction of the sludges, for example 0.8 bar relative.

This introduction of air takes place through a port 12 and creates a significant flow of compressed air in which the drops of sludge 13 will split up, allowing bad odors to be stripped by contact.

The port 12 is located below the meeting point with the effluents in zone 9, for example between a hundredth and a tenth of the height H of the chamber. This introduction of air also increases the energy level of the chamber, at increased pressure compared with its outlet 14 for evacuation of the effluents after treatment.

In the bottom part of the reactor (bottom 7), provision is made, in a manner known per se, of a blow off (not shown) for excessively dense products which do not escape via the top of the reactor, said blow off being emptied sequentially.

At the outlet 14 of the reactor, the emulsion of air and sludges 15 escape into an outlet line or reservoir R designed to be at atmospheric pressure (vent E), for example formed by a line of small size (for example 20 cm) which, following decanting at 16, provides transparent water 17 that is physically separated from the solid matter 18, which a very low solid matter content, in particular less than 30 mg/l, or even than 10 mg/l, whereas initially it could be close to 500 mg/l.

The decolloidized solid matter 18 obtained at this level is more porous and consequently easily compactable. It may even, depending on its initial organic matter content, be directly pelletizable on leaving the reactor.

The gas extracted from the reactor emerges with the water and the sludge at the rate of the increased pressure and can be recovered, treated and, if appropriate, recycled in order to be reused in the bottom part of the reactor.

It should be noted that the presence of coarse matter of the type of sand, gravel, etc., increases the number of impacts and as a result improves the process.

The pressure P in the chamber 2 is for its part designed and/or regulated so as to optimize the internal energy by generating a very rapid ascending flow 19 (for example 30 m/s or 40 m/s), emerging at the top.

Such a pressure is thus determined in accordance with the functional characteristics of the circuit (height of water in the pumps) but also on the type of effluents and the desired treatment rates.

The size finally chosen for the reactor will also be determined by a person skilled in the art in accordance with the basic knowledge of an engineer in the field of chemical engineering, and with the diagram of the flows.

The pressure and the outlet are ensured for example by way of a slide valve 20 which releases the flow when the given pressure is exceeded.

Since the method according to the invention employs agitation in three phases, solid, liquid and gaseous, it is necessary to implement separation at the outlet, taking into account the degassing, the solid phase that is denser than water, and the evacuation of the water.

In the embodiment more particularly described, a flocculant is added (arrow 21) at the outlet of the slide valve by way of a metering device that is known per se (not shown).

This addition takes place for example in the zone 22 at the continuous outlet from the evacuation means (slide valve or other valve 20) of liquid that has passed through the chamber, the slide valve or other valve 20, which opens above a given pressure in the chamber, for example 1.3 bar.

It is also possible not to provide a valve, the downstream circuit itself forming the head loss necessary to maintain the relative increased pressure in the chamber, for example by way of a venturi.

The emulsion 15 is then evacuated in the top part in order to arrive in a filtration bag 23 which is known per se.

However, this bag may be replaced by a vessel 24 (see FIG. 2).

For example, this decanting vessel 24 is formed by a cylindrical tank 25 into which the evacuation pipe 26 leads above the operating lever 27, in order to be at atmospheric pressure.

The vessel 24 for its part empties via an overflow 28, through a non-turbulent lateral tank portion 29 that is separated from the rest of the tank by a wall 30 that is perforated in locations.

The decanted solid matter 31 (FIG. 2) or filtered solid mater 18 (FIG. 1) is evacuated in the bottom part 32, or once the bag 23' is full in order to be able to be subsequently treated.

The emulsion thus agitated and fed with air remains in the reactor for a period of time corresponding to the relative ratio between the flow rates, the volume and the pressure.

It is thus kept for example for a residence time of a few seconds, for example less than one 1 minute before being evacuated.

This time may even be much less, since, with a flow rate of effluent of greater than 20 m$^3$/h, it is possible for example to remain in the chamber for a period of less than 10 seconds.

The feed rate of sludges has for its part a direct action on the percussion velocity, bearing in mind that the contact time and residence time in the reactor under pressure also acts on the speed of formation of the flocs and the decanting thereof.

The flow rate of air and the influence of the pressure in the reactor are furthermore elements which, in view of the desired result, will be adapted in a manner which is within the abilities of a person skilled in the art.

The supernatant or filtered water obtained has high purity and is itself evacuated continuously.

The sludge 31 obtained in the bottom part of the decanting vessel is evacuated either continuously or discontinuously, at given intervals, for example once per day.

Re-evacuating this sludge very quickly increases its quality in particular as far as its good porosity is concerned.

In the embodiment more particularly described here, the sludge 31, drained in a mobile vessel B, is then introduced for example by pumping into an extruder 33 formed by a closed cylindrical tube 34 that is perforated with orifices 35 through which the sludge is pushed for example by the introduction of compressed air at 36 via a tube 37 that dips into the tube 34. The sludge thus emerges in the form of rolls or batons 38 which are deposited by gravity in layers 39, 39' for example in a container 40 or, in the case of moving plant, directly onto spreading land. The residual water 41 flows and is evacuated easily on account of the high aeration of the layers 39, 39' which thus dry even more rapidly.

In a general manner, and with the above-described device being employed, a significant modification of the level of oxidation can be observed, the stripping of the sludge making it possible to pass from a redox of −250 mV to +250 mV.

Furthermore, the odor measurements carried out on the NH$_3$, mercaptans and the H$_2$S show that with the invention, the organic sludge (80% organic matter) which originates from a conventional treatment station for a residential community and has passed through the device described above with reference to FIG. 1, at a flow rate of 10 m$^3$/h with a flow rate of compressed air of 100 Nm$^3$/h and the addition of a conventional flocculant (polymer), has the following characteristics:

No odor of ammonia (measured <10 ppm)
No odor of H$_2$S (measured <10 ppm)
No odor of mercaptans (but measured >100 ppm).

An acceleration in biodegradation is also observed: in one month the organic matter content passes from MV=76.8% to MV=53.2%.

The treatment carried out by virtue of the method and reactor according to the invention thus makes it possible to obtain a porous and dewatered cake, the sludge recovered being empty, dry and manipulable. A few hours are sufficient as opposed to three months in the context of the use of what is known as conventional drying, in order to obtain a comparable result, the sludge obtained being odorless or smelling of humus, and thus being more easily recyclable.

As will be obvious, and as also results from the preceding text, the present invention is not limited to the embodiments more particularly described. By contrast, it encompasses all the variants and in particular those in which the orifices may be regulators, tubes passing into the interior of the chamber in order to minimize the distance between the outlets and to increase the force of the impacts, use is made of upstream reagents such as sand, calcium carbonate, slaked lime, the extruder is different and/or replaced by means for example having blades, in order to further aerate the sludge obtained and to further facilitate its rapidity of drying.

The invention claimed is:

1. A method for producing a deodorized cake of sludge by continuously treating a flow of liquid sludge, wherein the flow is injected at a flow rate q into a chamber at an increased pressure compared with atmospheric pressure, while also injecting air at a flow rate Q≥5 q into said chamber, prior to evacuation and separation between solid and liquid parts obtained, downstream of the chamber, wherein the liquid sludge is an organic sludge, the method being applied to the deodorization of the solid part obtained, in that the sludge is injected into a column of air at an increased pressure that is itself injected at said flow rate Q≥5 q, said column extending over a given length L along a longitudinal axis, said length L, the flow rate and the increased pressure of said column of air being designed to create in the chamber a fluidized bed wherein the sludge is aerolized, between a pipe for feeding the air and a line or a reservoir downstream of the fluidized bed obtained, in that said fluidized bed including air bubbles is evacuated into said line or said reservoir that is pressurized to atmospheric pressure or substantially to atmospheric pressure, and in that a flocculant is continuously introduced into said fluidized bed downstream of the chamber, under conditions designed to aggregate and/or coagulate the organic matter whereby the flocculant traps said bubbles of air in contact with the sludge producing micro-meter scale and millimeter scale microporous cake of sludge so that a dewatering and complete deodorization of the solid part obtained after separation are obtained, and further comprising the step of structuring said de watered cake so that deodorization is maintained on a long term basis.

2. The method as claimed in claim 1, wherein the flow of sludge is injected into the chamber opposite and at a distance d of less than a given value from a wall and/or from a screen of said chamber.

3. The method as claimed in claim 2, wherein d is less than 50 mm.

4. The method as claimed in claim 1, wherein the absolute pressure P of the column of air is greater than 1.5 bar.

5. The method as claimed in claim 1, wherein, with the chamber vertical, the flow is evacuated continuously or intermittently from the top part of said chamber by way of a pressure relief valve that triggers above a given threshold value defining the increased pressure of the column of air.

6. The method as claimed in claim 1, wherein the solid matter is separated continuously from the liquid by filtration through successive bags that are changed as they are filled with the filtered solid matter.

7. The method as claimed in claim 1, wherein a granular inorganic matter is added to the flow, this granular inorganic matter being sand.

8. The method as claimed in claim 1, wherein a granular inorganic matter is added to the flow, the granular inorganic matter being used in a proportion of greater than 5% of the dry matter content of the sludge.

9. The method as claimed in claim 1, wherein the air flows through the chamber at a flow rate Q≥20q.

10. The method as claimed in claim 1, wherein the flow rate q is greater than or equal to 100 $Nm^3/h$, and in that the relative pressure in the chamber is greater than or equal to 1 bar.

11. The method as claimed in claim 10, wherein the flow rate q is greater than or equal to 200 $Nm^3/h$ and the relative pressure in the chamber is greater than or equal to 1.2 bar.

12. The method as claimed in claim 1, wherein the flocculant is added in a proportion of between 0.5% and 3% of the dry matter content contained in the sludge.

13. The method as claimed in claim 1, wherein the flocculant is a cationic polymer.

14. The method as claimed in claim 1, wherein the effluents are degassed at the outlet of the chamber and the gases obtained are used to feed the injection of air in the bottom part.

15. The method as claimed in claim 1, wherein the cake obtained is recovered and dewatered by drying, pressing or centrifuging in order to obtain a solidified pancake.

16. A solidified organic sludge pancake obtained from the method as claimed in claim 15, wherein it has a porosity of greater than 40%.

17. The pancake as claimed in claim 16, wherein it is formed of layers and/or strips of sludge disposed one on top of another.

18. A device for treating a flow of liquid sludge fed continuously at a flow rate q, comprising:

means for feeding air at a flow rate Q≥5 q, a chamber extending over a given length L and along a longitudinal axis, designed to be fed by the air feeding means in the bottom part and comprising at least one tube for feeding sludge, said tube being located in the lower half of said chamber, means for injecting the sludge at said flow rate q into the chamber through said tube, an outlet line or reservoir of the flow of aerolized sludge downstream of the chamber, and means for separation between the solid part and the liquid part of the treated sludge, wherein, since the liquid sludge is organic, the length L, the flow rate Q and the increased pressure in the chamber are designed to create a fluidized bed, in that said line or said reservoir comprise means for pressurizing to atmospheric pressure or substantially to atmospheric pressure, and means for introducing a flocculant continuously into said line or said reservoir in order to aggregate/coagulate the organic matter in said line or said reservoir while deodorizing it, before the introduction into said separation means.

19. The device as claimed in claim 18, wherein at least one tube for feeding sludge to be deodorized is provided, said tube being located in the lower half of said chamber, the end of said tube projecting into the chamber and being located above the air feed and at a distance d from the opposite wall such that d≤50 mm.

20. The device as claimed in claim 18, wherein the flow is evacuated from the top part by way of a pressure relief valve that triggers above a given threshold value.

21. The device as claimed in claim 18, wherein the chamber is formed by a cylindrical column of diameter D, the given length L being greater than or equal to 10 times D.

22. The device as claimed in claim 18, wherein the outlet line has a diameter $d_0$ of between 0.5 D and 0.9 D.

23. The device as claimed in claim 18, comprising means for feeding a liquid oxygenation or coagulation reagent at a given flow rate.

24. The device as claimed in claim 18, comprising means for recovering the dewatered treated sludge that are formed by at least one filtration bag.

25. The device as claimed in claim 18, comprising means for extruding the treated sludge in separate rolls.

* * * * *

UNITED STATES PATENT AND TRADEMARK OFFICE
CERTIFICATE OF CORRECTION

PATENT NO. : 10,301,189 B2
APPLICATION NO. : 15/039821
DATED : May 28, 2019
INVENTOR(S) : P. Capeau et al.

It is certified that error appears in the above-identified patent and that said Letters Patent is hereby corrected as shown below:

On the Title Page

(72)     Inventors,     "Patrice Capeau, Marseilles (FR)" should read
Column 1     Line 1     --Patrice Capeau, Marseille (FR)--

In the Claims

Column 12     Line 34     "reservoir comprise" should read
(Claim 18)             --reservoir comprises--

Signed and Sealed this
Twenty-first Day of January, 2020

Andrei Iancu
*Director of the United States Patent and Trademark Office*